United States Patent
Nelson et al.

(10) Patent No.: US 9,472,046 B2
(45) Date of Patent: Oct. 18, 2016

(54) ELECTRONIC GAMING MACHINES AS SERVICE GATEWAYS

(71) Applicant: IGT, Reno, NV (US)

(72) Inventors: Dwayne R. Nelson, Las Vegas, NV (US); Erik B. Petersen, Reno, NV (US); Kevin M. Higgins, Reno, NV (US)

(73) Assignee: IGT, Reno, NV (US)

( * ) Notice: Subject to any disclaimer, the term of this patent is extended or adjusted under 35 U.S.C. 154(b) by 147 days.

(21) Appl. No.: 14/272,847

(22) Filed: May 8, 2014

(65) Prior Publication Data

US 2015/0326639 A1 Nov. 12, 2015

(51) Int. Cl.
| | |
|---|---|
| G06F 15/173 | (2006.01) |
| G07F 17/32 | (2006.01) |
| H04L 29/08 | (2006.01) |
| H04L 29/06 | (2006.01) |
| H04L 12/18 | (2006.01) |

(52) U.S. Cl.
CPC ........... *G07F 17/32* (2013.01); *G07F 17/3223* (2013.01); *G07F 17/3234* (2013.01); *H04L 12/18* (2013.01); *H04L 29/08* (2013.01); *H04L 63/0428* (2013.01); *H04L 67/02* (2013.01); *H04L 67/38* (2013.01); *H04L 12/185* (2013.01)

(58) Field of Classification Search
USPC .......................... 709/244, 201, 202, 223, 224
See application file for complete search history.

(56) References Cited

U.S. PATENT DOCUMENTS

| | | | |
|---|---|---|---|
| 8,015,154 B1* | 9/2011 | Anderson | G06F 17/30306 707/638 |
| 2014/0370971 A1* | 12/2014 | Kelly | G07F 17/3225 463/25 |

* cited by examiner

*Primary Examiner* — Lan-Dai T Truong
(74) *Attorney, Agent, or Firm* — Griffits & Seaton PLLC

(57) ABSTRACT

Managing a plurality of electronic gaming machines includes receiving a designation at a first electronic gaming machine (EGM) that the first EGM is a service gateway, broadcasting to other EGMs of the plurality of EGMs that the first EGM is the service gateway, and performing at least one of: discovering the other EGMs, identifying the other EGMs as client EGMs, and obtaining data from all of the client EGMs and retrieving crash data from all of the client EGMs, and communicating with a server to request performance of the at least one of the operations on selected ones of the plurality of EGMs.

17 Claims, 8 Drawing Sheets

ND EINIC GAMING MACHINES AS
SERVICE GATEWAYS

COPYRIGHT NOTICE

A portion of the disclosure of this patent document contains or may contain material, which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

1. Field of the Invention

The present invention relates in general to casino electronic gaming machines, and more particularly, to servicing electronic gaming machines.

2. Description of the Related Art

Electronic gaming machines where a player initiates game play by placing a wager are becoming increasingly more computerized. For example, the electronic gaming machines typically include microprocessors that display different types of games, such as slots, poker, and other games of chance. Additionally, the microprocessor determines game play results and displays the outcome to the play. As such, the electronic gaming machines include memories that store regulated gaming software that, when executed, provide the games. To attract players to the electronic gaming machines, display devices, such as the screen and other lighting devices on the machine, create visual spectacles for passersby to see.

As increased numbers of electronic gaming machines typically translates to greater revenue, casinos typically pack electronic gaming machines together tightly on a casino floor. In some casinos, the electronic gaming machines are networked together to communicate with a host system, such as the IGT Advantage™ system or sbX™ casino management system. If included, the host system, via a network protocol, can be used to propagate new regulated gaming software to certain ones of the electronic gaming machines on the casino floor, such as a single machine or a particular bank of machines, to configure one or more of the electronic gaming machines, to monitor the electronic gaming machines' activities, and/or to perform diagnostic functions. Other casinos do not have a host system.

In either case, in an event in which one of the electronic gaming machines experiences a failure, a service technician or casino operator typically must visit the casino floor to locate the failed electronic gaming machine and perform service operations on the failed electronic gaming machine, and at times, on other gaming machines. Likewise, when regulators visit casinos to monitor monetary activities of the electronic gaming machines, the regulators typically visit each electronic gaming machine in order to perform regulatory tasks, such as reading the meter values on the EGMs, monitoring security logs, installation logs, and monetary transaction logs, configuring payback percentages, progressive values and rates, and money acceptors, enabling or disabling the EGM, clearing tilts or other error conditions related to monetary transactions.

SUMMARY OF THE INVENTION

As many casinos are built on a grand scale, often including many miles of walking paths, traveling back and forth between the back room and a failed electronic gaming machine or from one failed EGM to another is extremely time-consuming and inconvenient. Moreover, some casino setups require the casino operator to provision system access privileges to operator slot technicians and/or machine service technicians, and if the access privileges are not initially set in place, the technicians must either wait until the casino operator performs certain tasks using its system access or request system access from the casino operator. Such coordination between the different entities further impedes information collection and places additional obstacles in debugging an issue before the information is overwritten by the EGM. Thus, there is a need to reduce the travel time between the host system and EGMs to be serviced and to provide a more convenient way for the slot technicians, machine service technicians, regulators, and casino operators to service the EGMs.

To address the aforementioned needs, by way of example only, methods, systems, and computer program products are provided for an improved EGM management system is now provided. In accordance with an embodiment, by way of example, a method of managing a plurality of electronic gaming machines including receiving a designation at a first electronic gaming machine (EGM) that the first EGM is a service gateway, broadcasting to other EGMs of the plurality of EGMs that the first EGM is the service gateway, and performing at least one of: discovering the other EGMs of the plurality of EGMs, identifying the other EGMs as client EGMs, and obtaining data from all of the client EGMs and retrieving crash data from all of the client EGMs, and communicating with a server to request performance of the at least one of the operations on selected ones of the plurality of EGMs.

Other methods, systems, and computer program products are also contemplated that provide the aforementioned advantages.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

To maintain the EGMs in operating condition, authorized operators, such as a service technician or regulator may be required to service one or more EGMs on the casino floor. In an embodiment, each of the EGMs is configured to become a service gateway. In particular, an operator, service technician, or a regulator chooses any EGM on a casino floor, for example, an EGM that is out of patron view and not in use, and configures the EGM for gateway mode. In this way, the EGM becomes a host EGM or gateway EGM. The host EGM can be used as a remote desktop to access a central server located in a backroom of the casino, in an embodiment. In another embodiment, the host EGM is part of a bank of EGMs and is used to service the other EGMs in the bank. In either case, configuring the EGM so that maintenance, service, and regulation of the EGMs can be performed on the casino floor, greatly improves convenience and efficiency in the upkeep of the EGMs and also reduces the downtime of the EGMs thereby translating to increased revenue for the casino.

Figure 1:
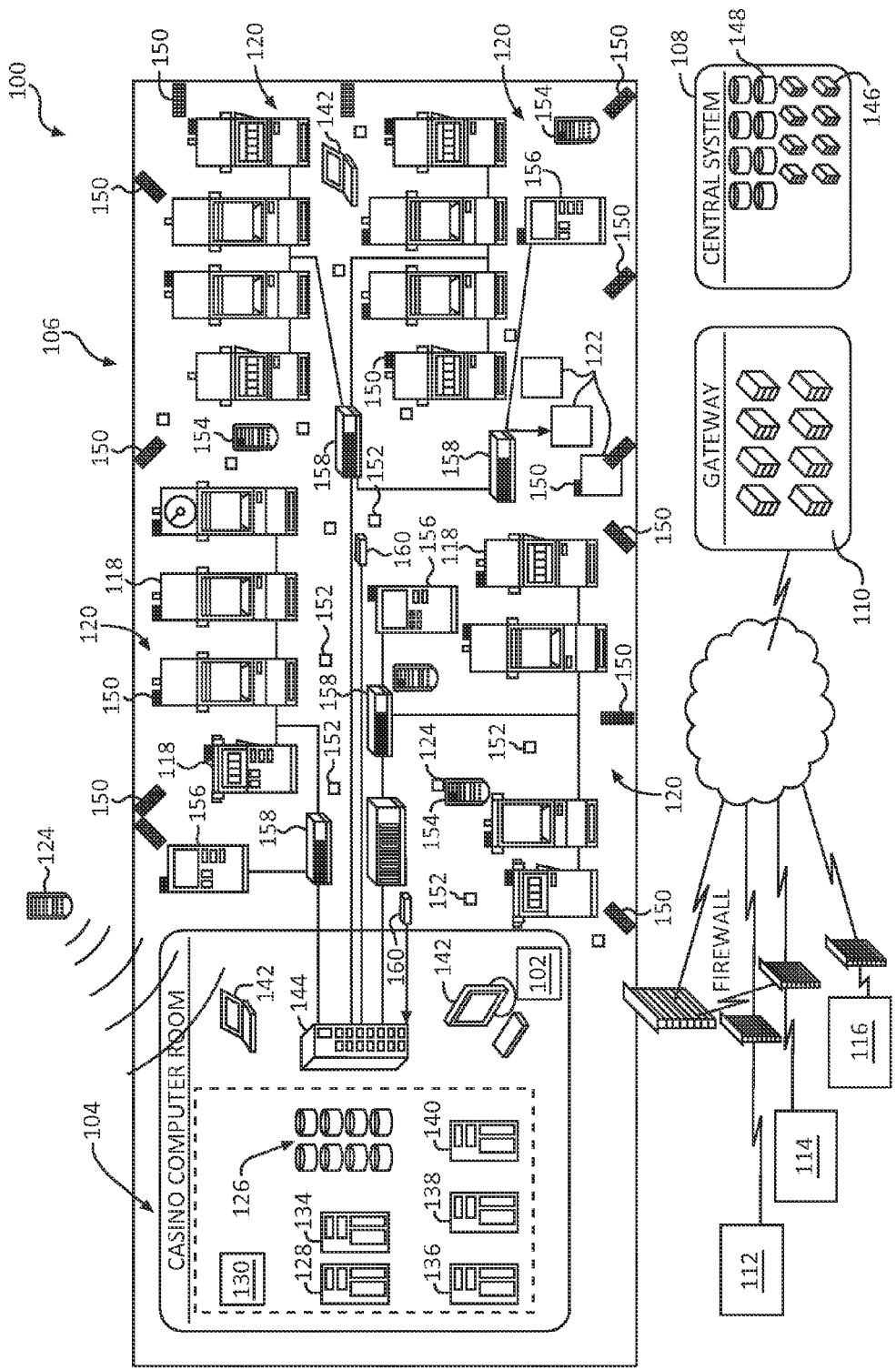
FIG. 1 is a block diagram illustrating a network infrastructure for providing a gaming system to be implemented at a casino including one or more electronic gaming machines, according to an embodiment.

Turning now to FIG. 1, a schematic block diagram of a server-based gaming network 100 is provided in accordance with an exemplary embodiment of the present invention. Network 100 provides methods and devices for managing one or more networked gaming establishments. Network 100 may be embodied in what is known as a server-based gaming network, sbX™ network. For example, in one embodiment, a host may be included in the network, such as a server-based gaming network. For example, a gaming server (e.g., an sbX™ server) may be an example of the host. The gaming server (e.g., the sbX™ server) may be a set of servers running central applications and may attach as the host to EGMs via the gaming network. In one embodiment, a host, operating in the gaming network, may be a server (e.g., an sbX™ server) managing and controlling the gaming network (e.g., an sbX™ network). In one embodiment, the host, operating in the gaming network, may monitor the monetary activity of the EGM. The host may track any error conditions on the EGM. The host may configure the EGM such as to enable/disable games, download games, and configure game parameters (denomination, payback, etc.). For example, a gaming management solution (e.g., IGT® sbX™ gaming management solution) may be a server-based system to act as a repository for all game content that may be downloaded to EGMs giving each EGM instant access to the technology within the EGM's environment. The game software, random number generator and game logic are controlled by the EGM. This significantly increases configuration speed so that games may be adapted and seamlessly integrate analytics to the database in minutes. Game titles are accessed from the server using a floor manager (e.g., IGT Floor Manager®), running on the host, and allow operators to reconfigure their gaming floor almost instantly. In one embodiment, the floor manager, operating on the host, is a G2S-compliant game-to-system management solution that enables operators to remotely change the game mix on the casino floor. In one embodiment, the floor manager application provides operators with sophisticated and user-friendly visualization tools to analyze terminal (e.g., the EGM) and game performance in real-time. Using Quick Change functionality (QCF), the floor manager, running on the host server(s), enables operators to rapidly locate low performing games, select a new theme from the game library and download the new theme on the EGM in the gaming venue floor within minutes. The software displays a map of the casino floor and highlights EGMs color-coded to indicate performance. Operators can select individual terminals and receive analysis at terminal-, multi-game and single-game level, based on KPIs such as coin-in, actual win and occupancy of game. In one embodiment, the floor manager application is a gateway to a game-to-system library allowing operators to quickly schedule changes or switch between themes. Once selected, the game's configurations can be set including denomination, max bet and even volume and credit limits on the EGM. For example, new gaming industry-leading themes may be added to the game library every month and the floor manager application provides rapid deployment to the gaming floor to ensures an EGM will maintain high performance and continually provide the user with newer and advanced games to add to the users favorite and/or preferred games. In one embodiment, the quick recognition and eradication of low performing games and ability to respond to consumer requests on the floor, empowers a gaming venue to concentrate on player satisfaction and gaming experience.

In addition, with the sbX™ gaming management, as each EGM connected to the system is self-sufficient, if there is a malfunction or connectivity fault, information is backed up at the individual EGM for a predetermined period of time (e.g., two weeks), ensuring no data loss. Once the problem is resolved and the EGM is re-connected to a server, the backed-up data is instantly dropped into the database. Operators now have the ability to run their own choice of games on any interconnected terminal in the gaming venue. This allows management to switch between games at any time, delivering an unmatched level of flexibility and control over their gaming environment. Users are also able to select the games (e.g., a favorite and/or preferred EGM) and denominations they wish to play at the terminal. In one embodiment, the sbX™ gaming management system delivers a flexible and diversified approach to management and control of the casino floor, reconfiguring gaming machines at the appropriate time and schedule. For example, in one embodiment, all EGMs connected to the server are granted full access to themes held in a games depository and operators can reconfigure each terminal remotely from the workstation. A Games Library may be included and may contain over 300 gaming titles in a game-to-system depository. In one embodiment, the sbX™ gaming management application allows for games to be updated in minutes and with this simple configuration process in place, operators can place better focus on in-depth player statistics. Accurate information in real-time optimizes marketing strategies, to provide the ultimate gaming experience and ensure the floor remains dynamic. Instantaneous analysis and decisions may be implemented to adjust elements and increase user satisfaction and loyalty. This also enables a gaming venue to ensure users are able to play the latest content available. Various game themes can be changed, tested and reverted in different areas of the gaming venue with rapid execution. In one embodiment, the sbX™ application and its integrated modules provide for data analysis and also focus on player experience thereby allowing for the development of innovative marketing programs. For example, in one embodiment, certain banks of machines may be adapted to a featured game, linked to a proprietary progressive jackpot and then heavily promoted during certain times. Thus, these games may become a favorite and preferred EGM during a particular time. Following the promotion, the EGMs can quickly be restored to their original games. In one embodiment, the sbX™ system may be driven by IGT's Advanced Video Platform (AVP®) with the technology seamlessly integrated with all modules, permitting fast connectivity and advanced capabilities. In addition, GSA open protocols are used so that sbX™ applications are interoperable with third-party devices that have also adopted GSA open protocols.

In an exemplary embodiment, network 100 includes a slot floor mix recommendation system 102 incorporated therein. In one embodiment, slot floor mix recommendation system 102 is a stand-alone system communicatively coupled to network 100. In various embodiments, slot floor mix recommendation system 102 is incorporated within various components of network 100. Thus, in one embodiment, if a demand for a particular type of the EGM is in high demand (e.g., multiple users are selecting a favorite and/or preferred game on a particular EGM) but the supply of the favorite and/or preferred game on a particular EGM is low, the floor manager application provides the ability to quickly (e.g., within minutes) update and replace the EGM's having low performing games and/or non-preferred games on the EGM with the higher performing and/or favorite and preferred game on a particular EGM.

In one embodiment, network 100 permits the convenient provisioning of networked gaming machines and other devices relevant to casino operations. Game themes may be easily and conveniently added or changed, if desired. Related software, including but not limited to player tracking software and peripheral software may be downloaded to networked gaming machines, mobile gaming devices, thin clients and/or other devices, such as kiosks, networked gaming tables, player stations.

In some implementations, servers or other devices of a central system will determine game outcomes and/or provide other wager gaming functionality. In some such implementations, wagering games may be executed primarily on one or more devices of a central system, such as a server, a host computer, etc. For example, wager gaming determinations, such as interim and final game outcomes and bonuses, may be made by one or more servers or other networked devices. Player tracking functions, accounting functions and some display-related functions associated with wagering games may be performed, at least in part, by one or more devices of a casino network and/or of a central system.

In the exemplary embodiment, network 100 includes a casino computer room 104 and networked devices of a gaming establishment 106. Gaming establishment 106, located in a physical environment which is not shown, is configured for communication with a central system 108 via a gateway 110. Other gaming establishments 112, 114, and 116 are also configured for communication with central system 108.

Gaming establishment 106 includes multiple gaming machines 118 located in one or more physical gaming environments, such as a casino, restaurant, off-track betting facility, and the like. Some of gaming machines 118 form a cluster or "bank" 120 of gaming machines 118. Gaming machines 118 are configured for communication with one or more devices of casino computer room 104 or similar devices disposed elsewhere in gaming establishment 106. Casino computer room 104 typically is located in a back room in gaming establishment 106, at times miles away from gaming machines 118. Some of gaming machines 118 may be configured to read from, and/or write information to, a portable instrument such as but not limited to, a ticket and a player loyalty device. It will be appreciated that many gaming establishments 106 include hundreds or even thousands of gaming machines 118, and/or mobile devices 124, not all of which are necessarily associated with bank 120 and some of which may not be connected to network 100. At least some of gaming machines 118 and/or mobile devices 124 may be "thin clients" that are configured to operate, at least in part, according to instructions from another device (such as a server).

Multiple storage devices 126, sbX™ server 128, License Manager 130, servers 134, 136, 138, and 140, host device(s) 142, and main network device 444 are disposed within computer room 104 of gaming establishment 106. In practice, more or fewer devices may be used. Depending on the implementation, some such devices may reside elsewhere in gaming establishment 106.

One or more of the devices in computer room 104 (or similar devices disposed elsewhere in gaming establishment 106 or in gaming establishment 112, 114, or 116) may be configured to provide functionality relevant to embodiments of the present invention. For example, one or more of servers 134, 136, 138, or 140 may be configured for communication with gaming machines 118 that are configured to provide a subset of themes for selection by a player. For example, one or more such servers may be configured to provide a selection of a subset of four themes from a large number of available themes.

Accordingly, in some embodiments at least some gaming establishments may be configured for communication with one another. In this example, gaming establishments 112, 114, and 116 are configured for communication with casino computer room 104. Such a configuration may allow devices and/or operators in casino 106 to communicate with and/or control devices in other casinos. In some such implementations, a server (or another device) in computer room 104 may be configured to communicate with and/or control devices in gaming establishments 112, 114, and 116. Conversely, devices and/or operators in another gaming establishment may communicate with and/or control devices in casino 106.

Some of these servers in computer room 104 may be configured to perform tasks relating to accounting, player loyalty, bonusing/progressives, configuration of gaming machines, etc. A Radius server and/or a DHCP server may also be configured for communication with the gaming network. In various embodiments, sbX™ server 128 and the other servers shown in FIG. 4 include or are in communication with clustered CPUs, redundant storage devices, including backup storage devices, switches, etc. Such storage devices may include a redundant array of independent disks (RAID) array, back-up hard drives and/or tape drives, etc.

In various embodiments, many of these devices (including but not limited to License Manager 130, servers 134, 136, 138, and 140, and main network device 444) are mounted in a single rack with sbX™ server 128. Accordingly, many or all such devices will sometimes be referenced in the aggregate as an "sbX™ server." However, in alternative implementations, one or more of these devices is in communication with sbX™ server 128 and/or other devices of the network but located elsewhere. For example, some of the devices could be mounted in separate racks within computer room 104 or located elsewhere on the network. Moreover, in some implementations large volumes of data may be stored elsewhere, e.g., via a storage area network ("SAN").

One or more of servers 134, 136, 138, and 140 are and multiple storage devices 126 may make up a game server, which can include a computing device including a processor and a memory. The game server may be adapted to perform a variety of functions. This functionality may be implemented by software and/or hardware of the server. In one embodiment, the game server may be arranged to provide information or instructions to the one or more gaming machines 118 or individual gaming system components. The information may comprise game code and control data. In one embodiment, the game server may also be arranged to accept information from the gaming machines 118 or components. For example, the game server may accept information regarding the status of operation of a particular gaming machine 118 (such as "normal" or "malfunction").

In one embodiment, the game server is part of a network, which includes a communication link between the game server and selected gaming machine 118 and/or other component(s) with which communication is desired. A communication interface may be associated with the game server and each machines or component for facilitating the communication. The communication interfaces may have a variety of architectures and utilize a variety of protocols such as IEEE-1394 (FireWire™) or Ethernet in the case where the communication link is a wired link, or a wireless link utilizing a wireless protocol such as WIFI, Bluetooth™, Radio Frequency (RF), Infrared, etc. The communication links may transmit electrical, electromagnetic or optical signals, which carry digital data streams, or analog signals representing various types of information. In one embodiment, the gaming machine 118 may include a master gaming controller, which controls the functions of game operation. The communication interface may be associated with the master gaming controller, permitting data to be transmitted between the game server and the master gaming controller.

Some embodiments include devices for implementing access control, security and/or other functions relating to the communication between different devices on the network. One or more devices in central system 108 may also be configured to perform, at least in part, tasks specific to embodiments of the present invention. For example, one or more servers 146, storage devices and/or host devices 142 of central system 108 may be configured to implement the functions described in detail elsewhere herein. One or more servers 146, storage devices 148 and/or host devices 142 of central system 108 may maintain player account information. For example, one or more of servers 146 includes a player-tracking server comprising a computing device including a processor and a memory. The player-tracking server may be adapted to perform player-tracking functions.

For example, the player-tracking server may store information regarding the identities of players and information regarding the game play of those players. This information may include time of play, coin in/coin out or other monetary transaction data, and in an arrangement where players are awarded points based on play, a player's point total. The player tracking system includes a communication link provided between the player tracking server and one or more of the gaming machines 118 having a player tracking function or other components of the network 100. In one embodiment, the gaming machine 118 may include a management interface board, which controls a card reader. The management interface board may be arranged to receive data from the master gaming controller of the gaming machine 118. A communication interface is associated with the management interface board, permitting data to be transmitted between the player tracking server and the management interface board.

In one embodiment, one or more servers 146, storage devices and/or host devices 142 of central system 108 includes at least one accounting server 130. The accounting server may comprise a computing device including a processor and a memory. The accounting server is preferably adapted to perform financial related functions, such as track financial transactions such as bets and payouts, and perform reconciliations with monies collected from the gaming machines 118. The accounting server may be associated with a wide variety of devices, including individual gaming system devices 124 and other servers. Once again, a communication link may be provided between the accounting server and each device with which communications is desired.

In one embodiment, one or more servers 146, storage devices and/or host devices 142 of central system 108 includes at least one progressive server 132. The progressive sever may comprise a computing device including a processor and a memory. The progressive server may be designed to generate progressive award information. In one arrangement, the progressive server may obtain information regarding amounts bet at specific gaming machines 118. Utilizing this information, a progressive jackpot award amount may be generated and updated using a specified protocol. The information may be transmitted to one or more displays associated with participating machines 118. Once again, a communication link is preferably provided between the progressive server and each machine with which communications is desired. For example, a link may be provided between the progressive server and accounting server for providing payout information to the accounting server. The accounting server also reads the paid amounts from the electronic gaming machines 118 as well and makes sure the paid amounts match what the progressive server claimed the paid amounts should have been. If the paid amounts don't match, then the accounting server may raise a flag for further investigation by casino staff or regulators.

Casino computer room 104 may include one or more operator consoles or other host devices that are configured for communication with other devices within and outside of computer room 104. Such host devices may be provided with software, hardware and/or firmware for implementing functions described herein. However, such host devices need not be located within computer room 104. Wired host devices 142 (which are desktop and laptop computers in this example) and wireless devices 124 (which are PDAs in this example) may be located elsewhere in gaming establishment 106 or at a remote location.

Cameras 450, radio frequency identification devices 152 and 154, etc., may be used to identify and/or track patrons, playing cards, chips, etc.

Gaming establishment 106 also includes networked kiosks 156. Kiosks 156 may include card readers, ticket readers, printers, a user interface system, one or more displays, etc. Depending on the implementation, kiosks 156 may be used for various purposes, including but not limited to cashing out, prize redemption, redeeming points from a player loyalty program, redeeming "cashless" indicia such as bonus tickets, smart cards, etc.

Kiosks 156 may be configured to read information from, and/or write information to, a portable instrument such as a smart card, a ticket, a card having a magnetic strip, etc. The corresponding gaming devices are preferably configured for communication with such kiosks 156 and vice versa. Accordingly, some such kiosks 156 may include a wireless interface that is configured for communication with mobile gaming devices 124.

In the exemplary embodiment, each bank 120 has a corresponding switch 158. Each switch 158 is configured for communication with one or more devices in computer room 104 via main network device 144, which combines switching and routing functionality in this example. Although various communication protocols may be used, some preferred implementations use the Gaming Standards Association's G2S Message Protocol. Some systems may use a gaming-industry-specific transport layer called CASH™, which offers additional functionality and security.

Gaming establishment 106 may also include an RFID network, implemented in part by RFID switches 160 and multiple RFID readers 152. An RFID network may be used, for example, to track objects such as mobile gaming devices 124, which include RFID tags 154, patrons, chips, player loyalty devices, etc., in the vicinity of gaming establishment 106.

Various alternative network topologies can be used to implement different aspects of the invention and/or to accommodate varying numbers of networked devices. For example, some gaming establishments may include cameras 150 for implementing advanced player tracking, player navigation or other functionality. Gaming establishments with large numbers of gaming machines 118 may require multiple instances of some network devices (e.g., of main network device 144, which combines switching and routing functionality in this example) and/or the inclusion of other network devices not shown in FIG. 1. Some embodiments may include one or more middleware servers disposed between kiosks 156, RFID switches 160 and/or bank switches 158 and one or more devices (e.g., a corresponding server, router or other network device) in computer room 104. Such middleware servers can provide various useful functions, including but not limited to the filtering and/or aggregation of data received from switches, from individual gaming machines and from other devices. Some implementations of the invention include load-balancing methods and devices for otherwise managing network traffic.

Figure 2:
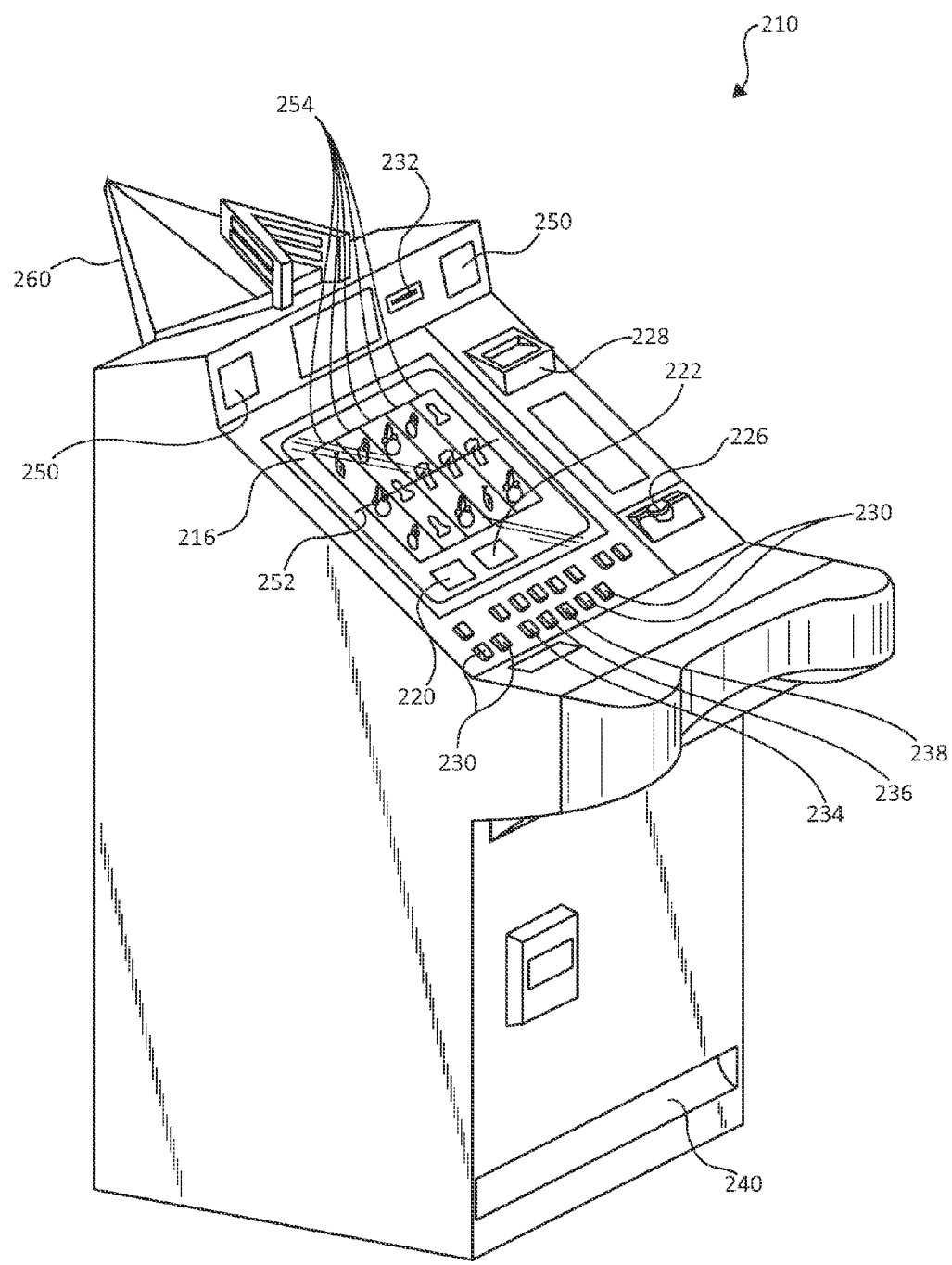
FIG. 2 is a perspective view of one embodiment of a EGM or gaming device suitable for use in the gaming system of FIG. 1, in which aspects of the present invention may be realized.

FIG. 2 is a perspective view of one embodiment 210 of a slot machine, EGM, or gaming device suitable for use in the previously depicted system of FIG. 1, in which aspects of the present invention may be realized. FIG. 2 represents a base gaming device 210 that can be employed in the shared display system or the gaming system of the present invention is illustrated as gaming device 210. FIG. 2 illustrates features common to each of the gaming devices. In one embodiment, gaming device 210 has a support structure, housing or cabinet, which provides support for a plurality of displays, inputs, controls and other features of a conventional gaming machine. In the illustrated embodiment, the player plays gaming device 210 while sitting, however, the gaming device is alternatively configured so that a player can operate it while standing or sitting. The illustrated gaming device 210 is positioned on the floor but can be positioned alternatively (i) on a base or stand, (ii) as a pub-style table-top game (e.g., where the participant gaming devices are located remotely from the shared wheel as discussed below), (iii) as a stand-alone gaming device on the floor of a casino with other stand-alone gaming devices, which the player operates while standing or sitting (e.g., where the participant gaming devices are located remotely from the shared wheel as discussed below), or (iv) in any other suitable manner. The gaming device 210 can be constructed with varying cabinet and display configurations. Also, referring to an embodiment for the electronic configuration of gaming device 210, each gaming device may include the components described below in FIG. 3A and FIG. 3B.

In one embodiment, each gaming device 210 randomly generates awards and/or other game outcomes based on probability data. That is, each award or other game outcome is associated with a probability and each gaming device generates the award or other game outcome to be provided to the player based on the associated probabilities. Since each gaming device 210 generates outcomes randomly or based upon a probability calculation, there is no certainty that the gaming device 210 will provide the player with any specific award or other game outcome.

In another embodiment, as discussed in more detail below, each gaming device 210 employs a predetermined or finite set or pool of awards, progressive awards, prizes or other game outcomes. As each award or other game outcome is provided to the player, the gaming device 210 removes the provided award or other game outcome from the predetermined set or pool. Once removed from the set or pool, the specific provided award or other game outcome cannot be provided to the player again. The gaming device 210 provides players with all of the available awards or other game outcomes over the course of the play cycle and guarantees a designated amount of actual wins and losses.

Figure 3A:
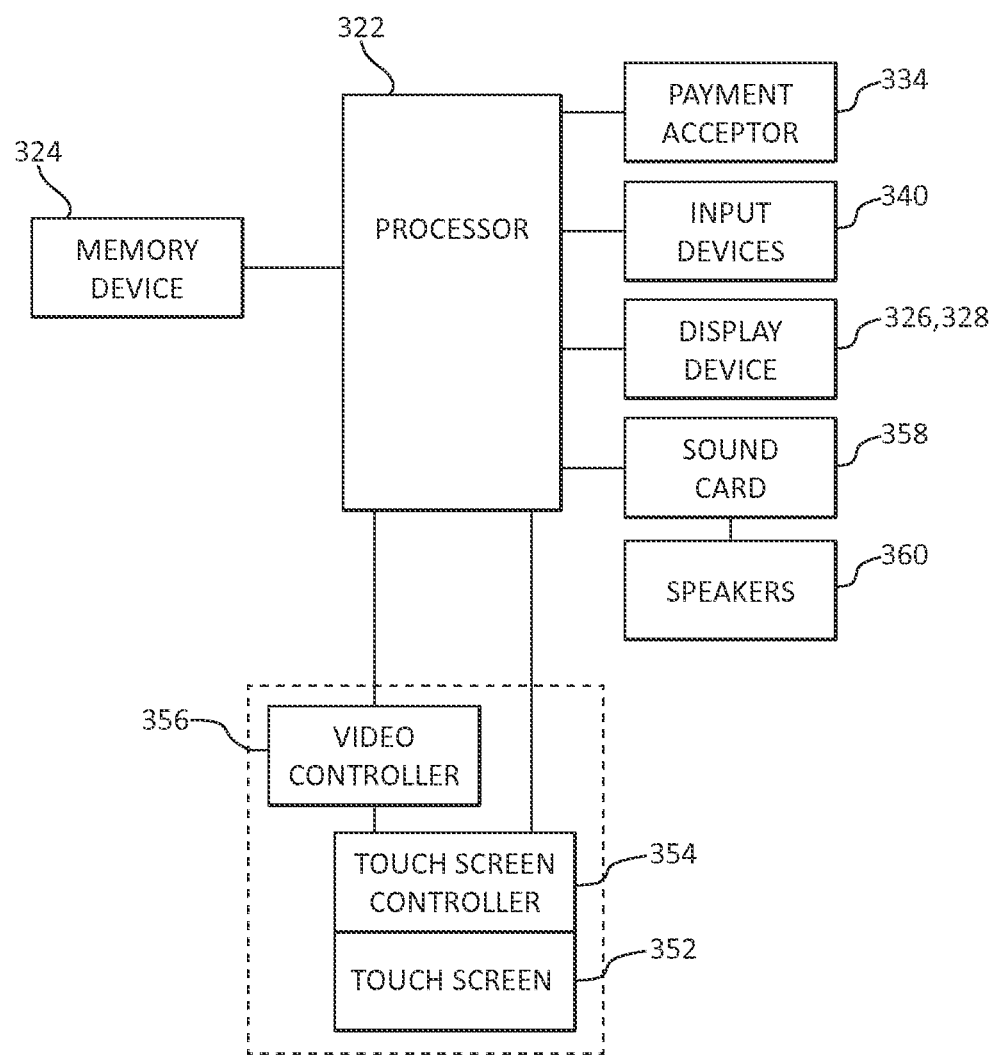
FIG. 3A is a block diagram illustrating an electronic configuration for use in the gaming device of FIG. 2, in which aspects of the present invention may be realized.

As seen in FIG. 2, the gaming device 210 includes a credit display 220 that displays a player's current number of credits, cash, account balance or the equivalent. In one embodiment, gaming device 210 includes a bet display 222 that displays a player's amount wagered. As illustrated in FIG. 3A, in one embodiment, each gaming device 210 includes at least one payment acceptor 334 (FIG. 3A) that communicates with processor 322 (FIG. 3A).

As seen in FIG. 2, the payment acceptor 334 (FIG. 3A) in one embodiment includes a coin slot 226, where the player inserts coins or tokens, and a ticket, note or bill acceptor 228, where the player inserts a bar-coded ticket, note, or cash. In one embodiment, a player-tracking card, credit card, debit card or data card reader/validator 232 is also provided for accepting any of those or other types of cards.

In one embodiment, a player inserts an identification card into card reader 232 of gaming device 210. The identification card can be a smart card having a programmed microchip or a magnetic strip coded with a player's identification, credit totals and other relevant information. In one embodiment, money may be transferred to gaming device 10 through an electronic fund transfer and card reader 232 using the player's credit, debit or smart card. When a player funds gaming device 210, processor 322 (FIG. 3A) determines the amount of funds entered and the corresponding amount is shown on the credit or other suitable display as described above. In one embodiment, after appropriate funding of gaming device 210, the player presses a play button 234 or pull arm (not illustrated) to start any primary game or sequence of events. In one embodiment, upon appropriate funding, gaming device 210 begins game play automatically. In another embodiment, the player needs to actuate or activate one of the play buttons to initiate play of gaming device 210.

As shown in FIG. 2, a bet one button 236 is provided. The player places a bet by pushing bet one button 236. The player increases the player's wager by one credit each time the player pushes bet one button 236. When the player pushes the bet one button 236, the number of credits shown in the credit display 220 decreases by one, and the number of credits shown in the bet display 222 increases by one. A max bet button (not shown) can also be provided, which enables the player to bet the maximum wager (e.g., max lines and max wager per line). Gaming device 210 may include other suitable wager buttons 230, such as a max bet button, a repeat bet button, one or more select paylines buttons and one or more select wager per payline buttons.

In one embodiment, a cash out button 238 is provided. The player presses cash out button 238 and cashes out to receive a cash payment or other suitable form of payment corresponding to the number of remaining credits. The player can receive coins or tokens in a coin payout tray 240 or a ticket or credit slip, which are redeemable by a cashier or funded to the player's electronically recordable identification card. Each gaming device 210 also includes one or a plurality of communication ports for enabling communication of a processor with one or more external peripherals, such as external video sources, expansion buses, expansion games or other displays, an SCSI port or a key pad.

In one embodiment of FIG. 2, in combination with in FIG. 3A, a touch-screen 352 (FIG. 3A) is provided in one embodiment and operates with a touch-screen controller 354, processor 322 (FIG. 3A) and display device 326, 328 (FIG. 3A). Touch-screen 352 (FIG. 3A) and the touch-screen controller 354 are also connected to a video controller 356. The player touches touch-screen 352 at appropriate places to input decisions and signals into processor 322 of gaming device 210. Also, each gaming device 210 may include a sound generating device controlled by one or more sounds cards 258, which function in conjunction with processor 322 (FIG. 3A). In one embodiment, the sound generating device includes at least one speaker 250 or other sound generating hardware and/or software for generating sounds, such as playing music for the primary and/or secondary game or for other modes of the gaming device, such as an attract mode. In one embodiment, each gaming device 210 provides dynamic sounds coupled with attractive multimedia images displayed on display device 216 to provide an audio-visual representation or to otherwise display full-motion video with sound to attract players to gaming device 210. During idle periods, the gaming device 210 displays a sequence of audio and/or visual attraction messages to attract potential players to gaming device 210. The videos in one embodiment are customized to provide information concerning the shared display of the present invention as discussed below.

In one embodiment, gaming device 210 includes a camera in communication with a processor, which is positioned to acquire an image of a player playing gaming device 10 and/or the surrounding area of gaming device 10. In one embodiment, the camera may be configured to selectively acquire still or moving (e.g., video) images and may be configured to acquire the images in either an analog, digital or other suitable format. Display device 216 may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

In one embodiment, as illustrated in FIG. 2, a base or primary game includes a slot game with one or more paylines 252. Paylines 252 may be horizontal, vertical, circular, diagonal, angled or any combination thereof. For a slot game, gaming device 210 displays at least one reel and preferably a plurality of reels 254, such as three to five reels, in either electromechanical form with mechanical rotating reels or in video form with simulated reels and movement thereof. Each reel 254 displays a plurality of indicia such as bells, hearts, fruits, numbers, letters, bars or other images, which preferably correspond to a theme associated with the gaming device. With a slot game, gaming device 10 awards prizes when reels 254 stop spinning and display a winning or paying symbol or combination of symbols on an active payline 252.

In one embodiment, each gaming device 210 includes indicators 260. Indicators 260 reside on the top of each gaming device 10 and point to or indicate one of the awards or outcomes on top of shared display (not shown) when the shared display stops spinning to reveal randomly or otherwise generated results or outcomes. Indicators 260 may illuminate differently at different times or states for the gaming device 210. The illumination of the indicator 260 in one embodiment depends upon whether the gaming device 210 is playing a base game, is in a state in which the player is eligible to play the shared display bonus, is in a state in which the player has committed to play the shared display bonus or is in a state in which the player has declined to play a particular upcoming shared display bonus, as well as other states discussed below.

FIG. 3A is a block diagram illustrating an electronic configuration for use in the gaming device of FIG. 2, here again in which aspects of the present invention may be realized. In the embodiment illustrated in FIG. 3A the player station may include at least one processor 322, such as a microprocessor, a microcontroller-based platform, a suitable integrated circuit or one or more ASICs. The processor 322 is in communication with or operable to access or to exchange signals with at least one data storage or memory device 324. In one embodiment, the processor 322 and the memory device 324 reside within the cabinet of the player station. The memory device 324 stores program code and instructions, executable by the processor 322, to control the player station. The memory device 324 also stores other data such as image data, event data, player input data, random or pseudo-random number generators, pay-table data or information and applicable game rules that relate to the play of the player station. In one embodiment, the memory device 324 includes random access memory (RAM), which can include non-volatile RAM (NVRAM), magnetic RAM (MRAM), ferroelectric RAM (FeRAM) and other forms as commonly understood in the gaming industry. In one embodiment, the memory device 324 includes read only memory (ROM). In one embodiment, the memory device 324 includes flash memory and/or EEPROM. Any other suitable magnetic, optical and/or semiconductor memory may operate in conjunction with the player station and gaming system disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming system is operable over a wireless network, such as part of a wireless gaming system. In this embodiment, the player station may be a hand held device, a mobile device or any other suitable wireless device that enables a player to play any suitable game at a variety of different locations. It should be appreciated that a player station as disclosed herein may be a device (e.g., EGM) that has obtained approval from a regulatory gaming commission or a device that has not obtained approval from a regulatory gaming commission. It should be appreciated that the processor and memory device may be collectively referred to herein as a "computer" or "controller."

In one embodiment, a background play feature may be available where a player, who may be sitting at the lounge and/or at the bar with friends (at the casino) may be playing a machine from the floor by remote via the external application (e.g., a smart phone). The player may substitute into the same game he wanted from an IGT online game and play, or backend the actual game though a venue network. The game may be bankrolled by the venue the player was inside. If the player was to win the player could collect from that venue where the player was located, and/or instead of "reserving" a machine he could continue the game with an auto play during a period of time the player took a break/recess. In one embodiment, a team game may be played by a group of players (e.g., a group of 3 or 4 players) and the group of players may watch and/or play the same game on each players individual external device (e.g., a computer and/or smart phone). Similarly, as described above, the team game may be played by a group of players from a remote location (e.g., bar, lounge, casino, home, office, restaurant, etc.). In one embodiment, the team game may be played by a group of players and the group of players may share credit inputs and wins. In one embodiment, the team game may be played by the group of players and the group of players may sell off and/or share double up options and/or credits to others team players of the group.

In one embodiment, as discussed in more detail below, the gaming device randomly generates awards and/or other game outcomes based on probability data. In one such embodiment, this random determination is provided through utilization of a Random Number Generator (RNG), such as a true random number generator, a pseudo random number generator or other suitable randomization process. In one embodiment, each award or other game outcome is associated with a probability and the player station generates the award or other game outcome to be provided to the player based on the associated probabilities. In this embodiment, since the player station generates outcomes randomly or based upon one or more probability calculations, there is no certainty that the player station will ever provide the player with any specific award or other game outcome. In another embodiment, each award or other game outcome is associated with a probability and the central controller or server generates the award or other game outcome to be provided to the player based on the associated probabilities. In one embodiment, each of the player stations includes an RNG and the central server controls the display of the central display. It should be appreciated there may be one or more RNG's per: (a) display segment; (b) central display; (c) player station; (d) number of games; (e) the number of potential games; or (f) any combination of the above. It should also be appreciated that one or more processors may work together and communicate to accomplish any suitable function of the gaming system.

In another embodiment, the gaming system employs a predetermined or finite set or pool of awards or other game outcomes. In this embodiment, as each award or other game outcome is provided to the player, the central controller flags or removes the provided award or other game outcome from the predetermined set or pool. Once flagged or removed from the set or pool, the specific provided award or other game outcome from that specific pool cannot be provided to the player again. This type of gaming system provides players with all of the available awards or other game outcomes over the course of the play cycle and guarantees the amount of actual wins and losses.

In one embodiment, as mentioned above and seen in FIG. 3A, one input device is a touch-screen 352 coupled with a touch-screen controller 354, or some other touch-sensitive display overlay to allow for player interaction with the images on the display. The touch-screen and the touch-screen controller are connected to a video controller 356. A player can make decisions and input signals into the player station by touching the touch-screen at the appropriate places. One such input device is a conventional touch-screen button panel. In another embodiment, a plurality or each of the display segments is a touch-screen 352 coupled with a touch-screen controller 354 or some other touch-sensitive display overlay to allow for player interaction with the images on the display segments. The touch-screens 352 and the touch-screen controllers 354 are connected to a video controller. The player station may further include a plurality of communication ports for enabling communication of the processor with external peripherals, such as external video sources, expansion buses, game or other displays, an SCSI port or a key pad. In one embodiment, at least one payment acceptor 324 that communicates with processor 322 for playing a bet, input devices 340, and display devices 326, 328 are provided.

The player stations, the central controller and the display segments may include serial interfaces and/or ethernet (e.g., G2S (game-to-system) protocol uses commodity Ethernet equipment and TCP/IP) to connect to specific subsystems or subnets internal and external to the player stations, central controller and the display segments. The serial devices may have electrical interface requirements that differ from the "standard" EIA serial interfaces provided by general-purpose computers. These interfaces may include EIA, Fiber Optic Serial, optically coupled serial interfaces, and current loop style serial interfaces, etc. In addition, to conserve serial interfaces internally in the player station, serial devices may be connected in a shared, daisy-chain fashion where multiple peripheral devices are connected to a single serial channel.

As noted briefly above, the EGM game software uses a state machine. Specifically, each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed RAM devices are used to preserve this critical data.

The serial interfaces and/or ethernet (e.g., G2S (game-to-system) protocol uses commodity Ethernet equipment and TCP/IP) may be used to transmit information using communication protocols that are unique to the gaming industry. For example, SAS is a communication protocol used to transmit information, such as metering information, from a player station to a remote device. Often SAS is used in conjunction with a player tracking system. EGMs may be treated as peripheral devices to a casino communication controller and connected in a shared daisy chain fashion to a single serial interface and/or ethernet. In both cases, the peripheral devices are preferably assigned device addresses. If so, the serial controller circuitry must implement a method to generate or detect unique device addresses. In one embodiment, security-monitoring circuits detect intrusion into a player station or gaming station by monitoring security switches attached to access doors in a designated area, such as a player station cabinet. In one embodiment, access violations result in suspension of game play and can trigger additional security operations to preserve the current state of game play. These circuits also function when power is off by use of a battery backup. In one embodiment, as seen in FIG. 3A, the player station includes a sound generating device controlled by one or more sounds cards 358 which function in conjunction with the processor. In one embodiment, the sound generating device includes at least one and preferably a plurality of speakers 360 or other sound generating hardware and/or software for generating sounds, such as playing music for the primary and/or secondary game or for other modes of the player station, such as an attract mode. In one embodiment, the player station provides dynamic sounds coupled with attractive multimedia images displayed on one or more of the display devices to provide an audio-visual representation or to otherwise display full-motion video with sound to attract players to the player station. During idle periods, the player station may display a sequence of audio and/or visual attraction messages to attract potential players to the player station. The videos may also be customized for or to provide any appropriate information.

In one embodiment, the gaming system may include a sensor, such as a camera in communication with the processor (and possibly controlled by the processor) that is selectively positioned to acquire an image of a player actively using the player station and/or the surrounding area of the player station. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia. In another embodiment, the gaming system includes a wireless transceiver or a camcorder and the display segments are components of or are connected to televisions, satellites, DVD players, digital video recorders and internet-enabled devices. In one embodiment, the game may be displayed on the central display and replicated on one or more the player stations. In another embodiment, the game is only displayed on the central display and the player station is only used to input decisions or commands in the game. In another embodiment, a primary or base game is displayed on the player station and/or the central display and one or more bonus games are displayed on the central display only. In one embodiment, the player stations provide other information to a player, such as the win/loss history of that certain games or the win/loss history of that player. It should be appreciated that the central display and the player stations may work together with a central controller or a plurality of servers to provide the games to the player in any suitable manner.

Figure 3B:
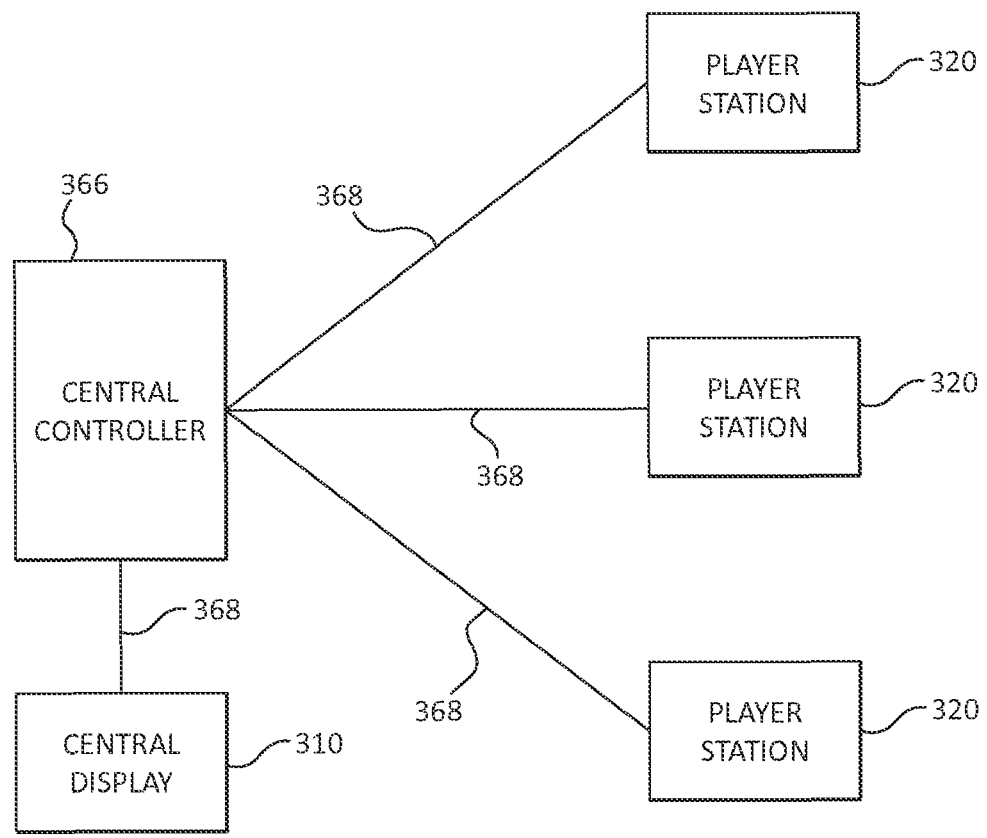
FIG. 3B is a block diagram illustrating player stations in communication with a central controller and a central display in communication with the central controller for use in the gaming device of FIG. 2, in which aspects of the present invention may be realized.

FIG. 3B is a block diagram illustrating a player station 320 in communication with a central controller and a central display 310 in communication with the central controller for use in the gaming device of FIG. 2, in which aspects of the present invention may be realized. In one embodiment, as illustrated in FIG. 3B, one or more of the player stations 320 are in communication with each other and/or at least one central server, central controller or remote host 366 through a data network or remote communication link 368. The central server, central controller or remote host is any suitable server or computing device, which includes at least one processor and at least one memory or storage device, and may also be in communication with a central display 310. In other embodiments, the central server is a progressive controller or a processor of one of the player stations in the gaming system. In these embodiments, the processor of each player station is configured to transmit and receive events, messages, commands, a current progressive value or any other suitable data or signal between the individual player station and the central server. The player station processor is operable to execute such communicated events, messages or commands in conjunction with the operation of the player station. Moreover, the processor of the central server is configured to transmit and receive events, messages, commands or any other suitable data or signal between the central server and each of the individual player stations. The central server processor is operable to execute such communicated events, messages or commands in conjunction with the operation of the central server. It should be appreciated that one or more of each of the functions of the central controller may be performed by one or more player station processors. It should be further appreciated that each of the functions of the player station processors, as disclosed herein, may be performed by the central controller. In one embodiment, the central controller has an Uninterruptible Power Supply ("UPS"). In one embodiment, the UPS is a rack mounted UPS module.

In one embodiment, the game outcome provided to the player is determined by a central server or controller and provided to the player at the player station. In this embodiment, each of the player stations is in communication with the central server or controller. Upon a player initiating game play at one of the player stations, the initiated player station communicates a game outcome request to the central server or controller. In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. The central server or controller is capable of storing and utilizing program code or other data similar to the processor and memory device of the player station. In an alternative embodiment, the central server or controller maintains one or more predetermined pools or sets of predetermined game outcomes. The central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes. The central server or controller communicates the generated or selected game outcome to the initiated player station. The player station receives the generated or selected game outcome and provides the game outcome to the player. In an alternative embodiment, how the generated or selected game outcome is to be presented or displayed to the player, such as a reel symbol combination of a player station or a hand of cards dealt in a card game, is also determined by the central server or controller and communicated to the initiated player station to be presented or displayed to the player. Central production or control can assist a gaming establishment or other entity in maintaining appropriate records, controlling gaming, reducing and preventing cheating or electronic or other errors, reducing or eliminating win-loss volatility.

In one embodiment, the player stations disclosed herein are associated with or otherwise integrated with one or more player tracking systems. In this embodiment, the player station and/or player tracking system tracks players gaming activity at the player station. In one such embodiment, the player station and/or associated player tracking system timely tracks when a player inserts their playing tracking card to begin a gaming session and also timely tracks when a player removes their player tracking card when concluding play for that gaming session. In another embodiment, rather than requiring a player to insert a player-tracking card, the player station utilizes one or more portable devices carried by a player, such as a cell phone, a radio frequency identification tag or any other suitable wireless device to track when a player begins and ends a gaming session. In another embodiment, the player station utilizes any suitable biometric technology or ticket technology to track when a player begins and ends a gaming session. During one or more gaming sessions, the player station and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. The player stations are capable of being connected together through a data network. In one embodiment, the data network is a local area network (LAN), in which one or more of the player stations are substantially proximate to each other and an on-site central server or controller as in, for example, a gaming establishment or a portion of a gaming establishment. In another embodiment, the data network is a wide area network (WAN) in which one or more of the player stations are in communication with at least one off-site central server or controller. The player stations may be located in a different part of the gaming establishment or within a different gaming establishment than the off-site central server or controller. Thus, the WAN may include an off-site central server or controller and an off-site player station located within gaming establishments in the same geographic area, such as a city or state. The WAN gaming system may be substantially identical to the LAN gaming system described above, although the number of player stations in each system may vary relative to each other.

In one embodiment, as a benefit to one or more of the gaming venues (e.g., a casino), using the player tracking system, along with use of the GPS positioning, for identifying the movements of the players throughout the gaming venues, identifying cash, money, credits, and award amounts spent along with various trends (e.g., historical) for generating visual graphs while displaying showing top view of the gaming venue (e.g., looking down from above the gaming venue) to improve casino layouts and identify patterns an movements of all types of players.

In another embodiment, the data network is an internet or intranet. The operation of the player station can be viewed at the player station with at least one internet browser. Operation of the player station and accumulation of credits may be accomplished with only a connection to the central server or controller (the internet/intranet server) through a conventional phone or other data transmission line, digital subscriber line (DSL), T-I line, coaxial cable, fiber optic cable, WIFI, or other suitable connection. Players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, the gaming system is in communication with a central server or controller. The central server or controller may be any suitable server or computing device, which includes at least one processor and a memory or storage device. In alternative embodiments, the central server is a progressive controller or another player station in the gaming system. In one embodiment, the memory device stores different game programs and instructions, executable by a player station processor, to control the player station. Each executable game program represents a different game or type of game, which may be played on one or more of the player stations in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the player station) or vice versa.

In this embodiment, one, all or a plurality of the player stations at least includes one or more display devices and/or one or more input devices for interaction with a player. A local processor, such as the above-described player station processor or a processor of a local server, is operable with the display device(s) and/or the input device(s) of one or more of the player stations. In operation, the central controller is operable to communicate one or more of the stored game programs to at least one local processor. In different embodiments, the stored game programs are communicated or delivered by embedding the communicated game program in a device or a component (e.g., a "chip" to be inserted in a player station), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the player station. That is, when a game program is communicated to a local processor, the local processor changes the game or type of game played at the player station or displayed on the display segment. Though the illustrated embodiments are described with the central controller determining a game result for the player and communicating that result to the central display 310 and one or more player stations, any other suitable game determining method may be employed in any embodiment of the present disclosure. In one embodiment, the central display 310 is associated with a central display 310 server. This central display 310 server determines the game outcome for the games played on each of the display segments. The central display 310 server communicates the game outcome to the central controller, which communicates the game outcome to one or more of the player stations.

In one embodiment, the central controller determines the award to provide to the player based on the game outcome. In another embodiment, the player stations determine the award and/or progress jackpot/value to provide to the players based on the game outcomes. In another embodiment, the central controller determines the game outcome displayed on the central display 310 and the player station determines any award and/or progress jackpot/value to provide to the player based on the game outcome. The player station determines both the game outcome and any award to provide to the player based on the game out come. In another embodiment, the central controller determines part of the outcome and the player station determines part of the outcome. That is, both the central controller and the player station determine part of a player's outcome and/or award.

Further, in the gaming industry, many different manufacturers make gaming machines and player stations. The communication protocols on the player station may be hard-wired into the player station and each player station/gaming machine manufacturer may utilize a different proprietary communication protocol. A player station manufacturer may also produce host systems, in which case their player stations are compatible with their own host systems. However, in a heterogeneous gaming environment, player stations from different manufacturers, each with its own communication protocol, may be connected to host systems from other manufacturers, each with another communication protocol. Therefore, communication compatibility issues regarding the protocols used by the player stations in the system and protocols used by the host systems must be considered.

In another embodiment, player stations at one or more gaming sites may be networked to a central server in a progressive configuration, wherein a portion of each wager to initiate a base or primary game may be allocated to bonus or secondary event awards. In one embodiment, a host site computer is coupled to central servers at a variety of mutually remote gaming sites for providing a multi-site linked progressive automated gaming system. The host site computer may serve player stations distributed throughout a number of properties at different geographical locations including, for example, different locations within a city or different cities within a state. The host site computer may be maintained for the overall operation and control of the system. A host site computer may govern/control the entire progressive gaming system and may be the master for computing all progressive jackpots and values for each and every gaming device. All participating gaming sites report to, and receive information from, the host site computer. Each central server computer may be responsible for all data communication between the player station hardware and software and the host site computer. An individual player station may trigger a progressive win, for example through a game play event such as a symbol-driven trigger in the multi-component game. The central server or other central controller determines when a progressive win is triggered. The central controller and an individual player station may work in conjunction with each other to determine when a progressive win is triggered, for example through an individual player station meeting a predetermined requirement established by the central controller. The progressive award win may be triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a player station is randomly or apparently randomly selected to provide a player of that player station one or more progressive awards. In one such embodiment, the player station does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game. In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards).

In accordance with another embodiment, the EGMs are not associated with a host system, but are nonetheless networked together. For example, two or more EGMs may be in communication with each other and with a casino computer room.

In any case, during operation of the EGMs, one or more of the player sites may experience an error, which may potentially cause disruption of game play. During other instances, an authorized operator may need to perform general maintenance on one or more of the EGMs and/or may need to collect/obtain data from one or more of the EGMs. Rather than requiring the authorized operator to visit the casino computer room, each EGM is configured to allow execution of instructions that switch the EGM from a normal mode, during which patrons can engage in game play on the EGM, and a gateway mode. In the gateway mode, the EGM becomes a terminal through which the authorized operator configures, installs, and generally accesses any EGM on the casino floor. To convert the EGM into a terminal or gateway, the EGM is either preloaded with a service gateway control program or the program is uploaded to the EGM.

In an embodiment, the service gateway control program includes a security module and a mode switching module. The security module provides an encryption key, for example, a USB encryption key or any other suitable security key, for accessing a selected EGM. The mode switching module generally includes executable instructions that cause the EGM to switch from a normal operating mode to a gateway mode. The normal operating mode is a mode in which the EGM operates during normal gaming operations allowing patrons to engage in gameplay on the EGM. When switched to the gateway mode, the EGM changes the EGM display from a normal gaming interface to an interactive service window interface. The service window interface provides a plurality of selectable options, which are the same options that would be provided, if the authorized operator had accessed the EGM through a workstation in the casino computer room, in an embodiment. In another embodiment, the service window interface includes selectable options that feature operations that previously would have been performed individually on each EGM in a bank. For example, the selectable options include downloading various logs and/or captured state data from each memory of each EGM, the ability to enable or disable particular EGMs, and the like. In an embodiment, in addition to providing access to the EGM, the security module also allows the EGM to access the network. In an example, the security module allows the EGM to present another encryption key or other security feature to the network. In another embodiment, the EGM includes an identifier that is stored in a security database on the network, and the EGM requests an encryption key from the network. If the EGM identifier matches the identifier stored in the security database on the network, the network sends an encryption key to the EGM for access to the network.

By configuring the EGM to being a service gateway, the authorized operator can choose a machine that is not in use and out of patrons' view on a casino floor and discretely service another EGM without disrupting the gaming experiences of casino patrons. Additionally, as the use of EGM as a service gateway reduces the need for the authorized operator to travel, sometimes miles, from one EGM location to another, or from the casino floor to the backroom, time efficiency and, in turn, casino revenue increases as a result.

Figure 4:
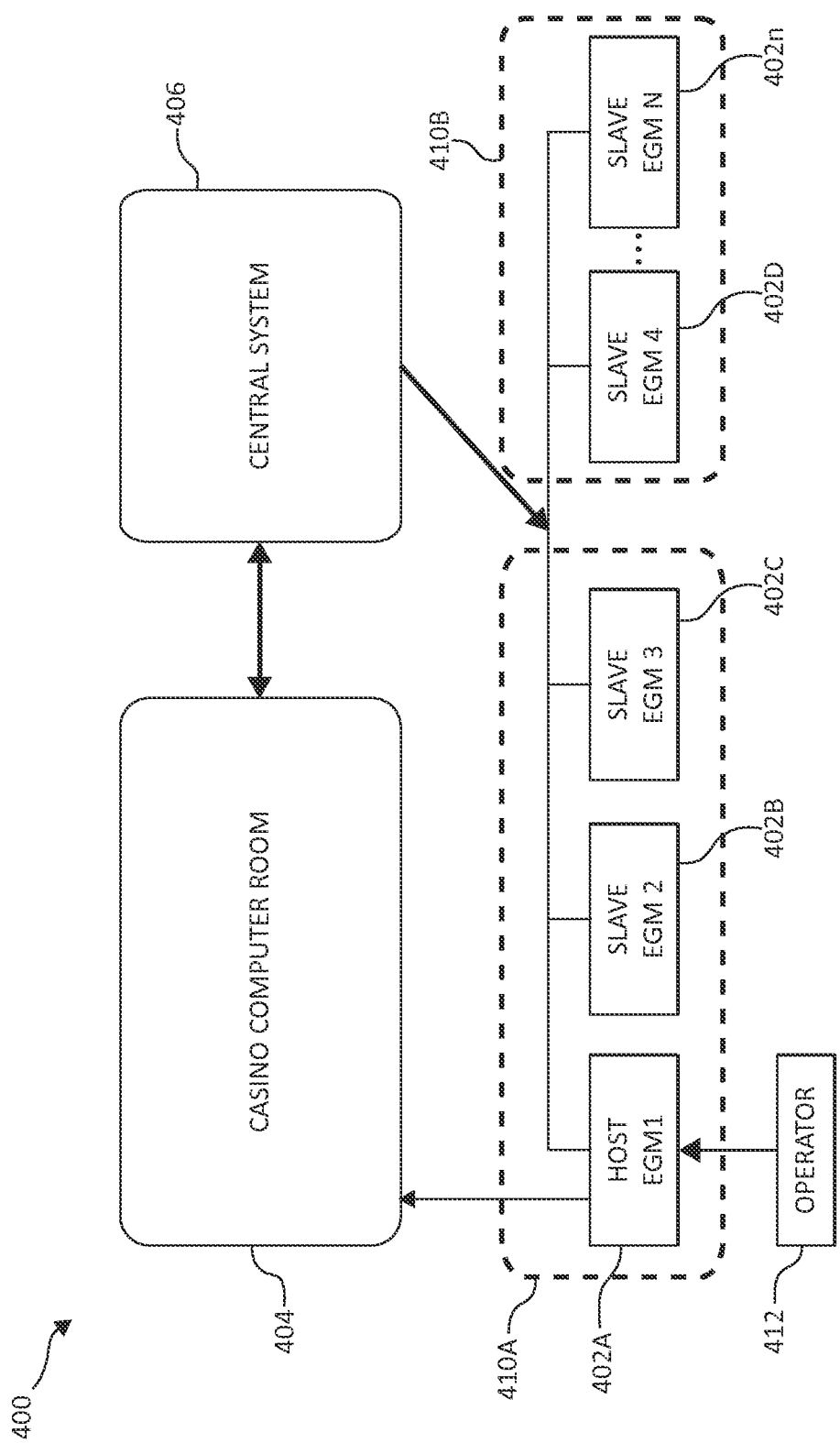
FIG. 4 is a block diagram illustrating a portion of a gaming system, in which aspect of the present invention may be realized.

Turning now to FIG. 4, a simplified, diagrammatic block diagram of a gaming system 400 is provided in which aspects of the invention may be realized. The gaming system 400 includes a plurality of EGMs 402a-402n, each similar to gaming machine 118 described above, and that, as illustrated, communicate with each other and with a casino computer room 404 and central system 406. Communication is established via one of the secured communication protocols described above. It will be appreciated that casino computer room 404 and central system 406 are configured substantially similarly to casino computer room 102 and central system 108 described above in conjunction with FIG. 1. EGMs 402a-402n are grouped into banks 410a and 410b. Although two banks are illustrated, more banks are included in alternate embodiments.

Figure 5:
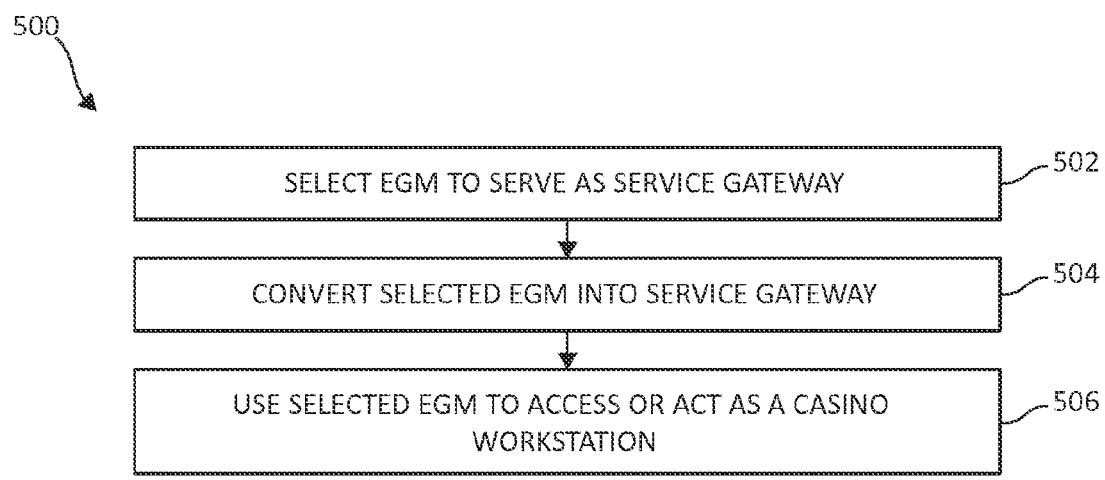
FIG. 5 is a block diagram illustrating an exemplary method of managing a plurality of electronic gaming machines in which aspects of the present invention may be realized.

In an embodiment, one or more of EGMs 402a-402n is selected by an authorized operator 412 and used as a remote desktop for accessing the casino computer room 404 and thereby acting as an extension of the casino computer room 404 on the casino floor. With additional reference to a flow diagram 500 of FIG. 5, in this regard, the authorized operator 412 selects an EGM, here EGM 402a of bank 410a, to act as a service gateway at step 502. After selection, the authorized operator 412 converts the selected EGM 402a into the service gateway at step 504. For example, in an embodiment in which all of the EGMs 402a-402n are preloaded with a service gateway control program, the authorized operator 412 presents a universal serial bus (USB) encryption key, or other suitable device including an encryption key, into a corresponding port located on the selected EGM 402a. In response to recognizing and verifying the encryption key, the selected EGM 402a switches from a normal mode to a gateway mode to thereby execute the service gateway control program. In an alternate embodiment, the service gateway control program is not preloaded on any of the EGMs 402a-402n. In such case, the authorized operator 412 loads the service gateway control program to the selected EGM 402a via a USB drive or other portable mass storage device. After the service gateway control program is loaded on the selected EGM 406a, the program can be executed to place the EGM 402a into the gateway mode thereby opening a service gateway and converting the selected EGM 406a into a management terminal.

After the selected EGM 402a switches to the gateway mode, the authorized operator 412 uses the selected EGM 402a to access or to act as one of a casino workstations of casino computer room 404 at step 506. Essentially, the selected EGM 402a serves as a terminal to the casino computer room 404 and hence, the authorized operator 412 uses selected EGM 402a in gateway mode to perform all operations on the gaming system 400 that one would perform while using the casino workstation in the casino computer room 404, such as, for example, any one or more of the operations described above in conjunction with the network 100. In an embodiment, communication between the selected EGM 402a and the casino computer room 404 occurs over a proprietary protocol, a hypertext transfer protocol (http), or a remote desktop. According to an embodiment, the authorized operator 412 enters the address of the selected EGM 402a (i.e., the selected EGM 402a as the remote desktop destination) into the service gateway in order to access the casino computer room 404. In another embodiment, the authorized operator 412 uses the selected EGM 402a simply as a terminal and after the EGM 402 enters the gateway mode to open the service gateway, the service gateway discovers over the network all client EGMs or back-end services and presents the authorized operator 412 with a list of remote desktop destination candidates). For example, the selected EGM 402a sends a broadcast via a network protocol, such as a broadcast or multicast network protocols, and the other EGMs respond and are discovered by the selected EGM 402a allowing the selected EGM 402a to learn of the presence of all other EGMs in a grouping of networked EGMs that may be possible remote desktop destination candidates. The authorized operator 412 then selects one of the candidates and the casino computer room 404 recognizes the selected client EGM as the remote desktop. This latter embodiment may be preferable in some cases, as it may avoid potential human error.

Figure 6:
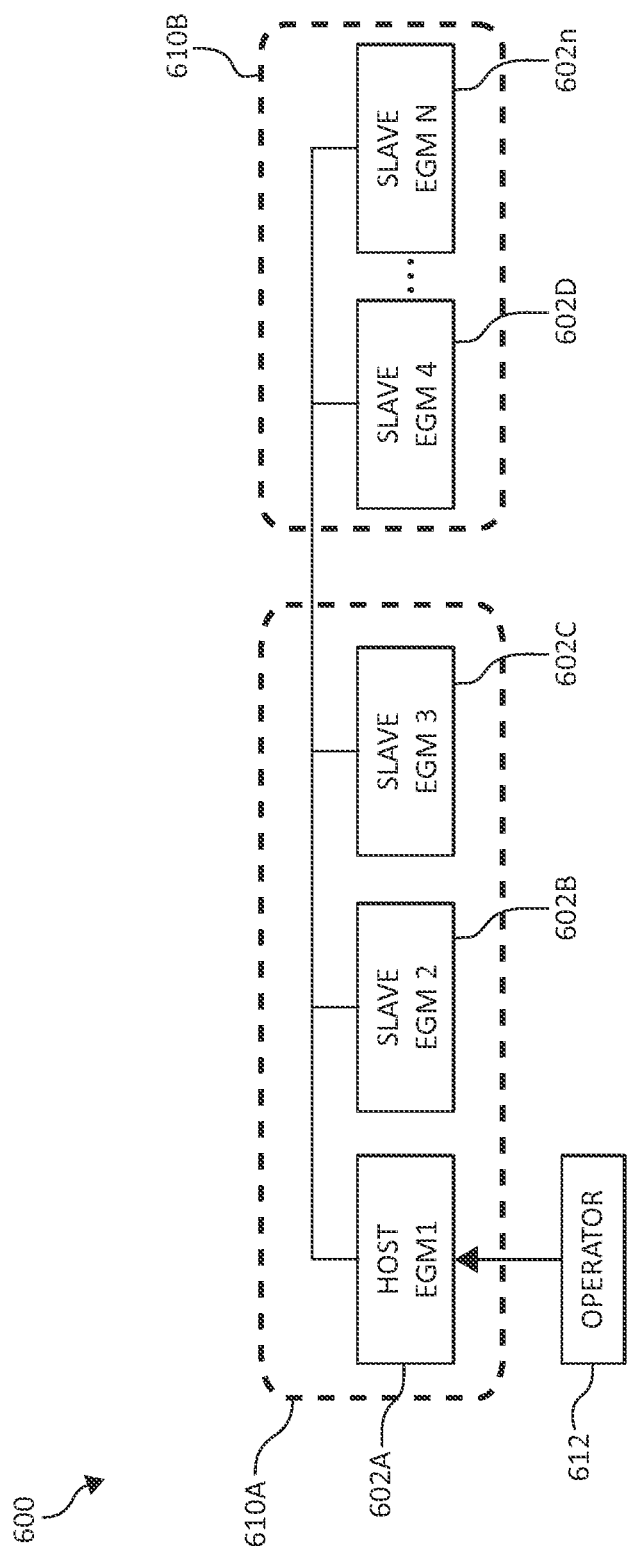
FIG. 6 is a block diagram illustrating a portion of another gaming system, in which aspect of the present invention may be realized.

In addition or as an alternative to using a selected EGM as a remote desktop, the selected EGM, may be instructed to execute operations to cause the EGM to act as a host EGM that provides the service gateway. Turning now to FIG. 6, a simplified, diagrammatic block diagram of a gaming system 600 is provided in which aspects of the invention may be realized. The gaming system 600 includes a plurality of EGMs 602a-602n, each similar to gaming machine 118 described above, that, as illustrated, communicate with each other via one of the secured communication protocols described above. Although not shown, it will be appreciated that EGMs 602a-602n may communicate with a casino computer room and central system that are configured substantially similarly to casino computer room 102 and central system 108 described above in conjunction with FIG. 1. EGMs 602a-602n are grouped into banks 610a and 610b, and although two banks are illustrated, more banks are included in alternate embodiments.

Figure 7:
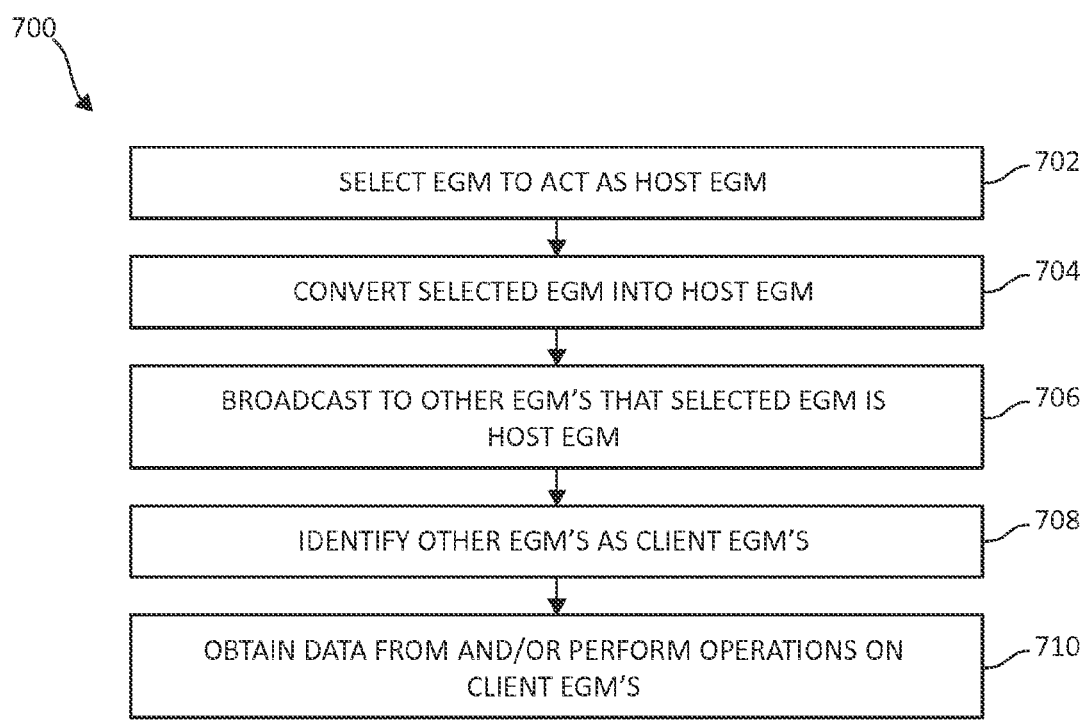
FIG. 7 is a block diagram illustrating another exemplary method of managing a plurality of electronic gaming machines in which aspects of the present invention may be realized.

With additional reference to flow diagram 700 of FIG. 7, in an initial step 702 of method 700, an authorized operator 612 selects an EGM to act as a host EGM. According to an embodiment, EGM 602a of bank 610a is selected. After selection, authorized operator 612 converts EGM 602a into the host EGM at step 704. For example, in an embodiment in which all of EGMs 602a-602n are preloaded with a service gateway control program, the authorized operator presents a universal serial bus (USB) encryption key, or other suitable device including an encryption key, into a corresponding port located on the EGM 602a. In response to recognizing and verifying the encryption key, the EGM 602a switches from the normal mode to the gateway mode to thereby execute the service gateway control program. In an alternate embodiment, the service gateway control program is not preloaded on any of the EGMs 602a-602n, and hence, authorized operator 612 loads the service gateway control program to the selected EGM 602a via a USB drive or other portable mass storage device. After the service gateway control program is loaded on the selected EGM 602a, the program can be executed to place the EGM 602a into the gateway mode thereby converting the selected EGM 602a into the host EGM.

Next, the selected EGM 602a broadcasts to the other EGMs 602b-602n that it is a host EGM at step 706. Broadcasting occurs using a network protocol, such as a broadcast or multicast network protocols. Specific suitable examples include, but are not limited to a user datagram protocol (udp) broadcast or generally an Internet protocol (ip) multicast. In response to the communication, the other EGMs respond and are discovered by the host EGM at step 708. In this way, the selected EGM 602a learns of the presence of all other EGMs in a grouping of networked EGMs. The service gateway control program, in an embodiment, causes the selected EGM 602a to discover all other EGMs that are in a corresponding bank, e.g., bank 610a including EGMs 602a, 602b, and 602c. Alternatively, the service gateway control program causes the selected EGM 602a to discover all other EGMs in a bank not including EGM 602a (e.g., bank 612b including EGMs 602d . . . 602n). In another embodiment, the selected EGM 602a discovers all other EGMs in all banks of EGMs located on the casino floor. Discovery occurs by the exchange of certificates or other security credentials to ensure secure connection. Alternatively, the EGMs 602a-602n learn about each other from a host system implemented into gaming system 100, for example, via an IGT Advantage™ system or sbX™ casino management system.

After the selected EGM 602a is connected to the other EGMs in the network, the other EGMs are identified as client EGMs at step 708, and the selected EGM 602a obtains data from and/or and performs one of a multitude of operations on the one or more client EGMs at step 710.

In an embodiment, the selected EGM 602a obtains crash information from the client EGMs. Alternatively, instructions are sent to the client EGM to push crash information to the selected EGM 602a. The crash information is recorded locally on the hard drive of the selected EGM 602a, or stored in a removable mass storage device, such as a USB thumb drive. By performing a state capture from each of the EGMs and recording the crash information to a single location, comparisons of the error information from the various EGMs can be made in order to obtain an overview of a potential issue that may affect more than one of the EGMs. The overview is used to diagnose the potential issue, and ultimately, provide a resolution that can be implemented on the EGMs. In any case, the authorized operator can download the state information to the selected EGM on the casino floor in a single click.

As noted briefly above, in addition to service technicians, a regulator (i.e., an authority from a regulatory agency, such as the state or federal department of revenue or another agency regulating gambling and/or betting activities) occasionally requires access to the EGMs to obtain monetary value information for taxation or other regulatory purposes. In an embodiment, the regulator via the host EGM collects monetary activity data from all of the client EGMs without visiting each EGM on the casino floor. The host EGM is used by the regulator to access various logs, including security and installation logs, and/or to configure or verify payout and monetary transactions that occur from at the EGMs, including but not limited to payback percentages, progressive values, progressive rates, money acceptors, clearing tilts and/or clearing error conditions. In particular, the regulator obtains not only logs and transaction information from the host EGM, but also such information from the client EGMs connected to the host EGM. As a result, the regulator can perform all regulatory tasks from the access of the single host EGM at a single location on the casino floor.

As will be appreciated, any one or more of the multitude of operations described in conjunction with step 710 of FIG. 7 may also be performed when the EGM serves as the service gateway as a remote desktop, as described above in step 506 of FIG. 5.

By employing one of the EGMs as service gateway, service technicians can not only avoid walking many miles between the back room and a failed electronic gaming machine or from one failed EGM, but can also perform maintenance or service operations on EGMs without waiting for the casino operator to grant access to its systems. Eliminating the need for coordination between the different entities improves information collection and removes obstacles in debugging issues, as the collection of information from the EGMs is more easily performed prior to being overwritten. As a result, the above-described mechanism is a more convenient way for the slot technicians, machine service technicians, regulators, and casino operators to service the EGMs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method of managing a plurality of electronic gaming machines comprising:
   receiving a designation at a first electronic gaming machine (EGM) that the first EGM is a service gateway, wherein receiving the designation includes downloading a control program, and in response to the downloading, switching the first EGM into a gateway mode and converting the first EGM into the service gateway;
   broadcasting to other EGMs of the plurality of EGMs that the first EGM is the service gateway; and
   performing at least one operation of:
      wherein the first EGM is a host EGM, discovering the other EGMs of the plurality of EGMs, identifying the other EGMs as client EGMs, and obtaining data from all of the client EGMs,
      retrieving crash data from all of the client EGMs, and
      communicating with a server to request performance of the at least one of the operations on selected ones of the plurality of EGMs.

2. The method of claim 1, wherein the step of receiving the designation includes providing access to a control program in response to receipt of an encryption key, switching the first EGM into a gateway mode, and in response to switching to the gateway mode, executing the control program to convert the first EGM into the service gateway.

3. The method of claim 1, wherein the step of broadcasting includes using a broadcast or multicast network protocol to inform the other EGMs that the first EGM is the service gateway.

4. The method of claim 1, wherein the step of discovering includes exchanging certificates between the service gateway and the client EGMs.

5. The method of claim 1, further comprising validating games on all client EGMs on a casino floor through the service gateway.

6. The method of claim 1, further comprising downloading software packages onto the host EGM and distributing the downloaded software packages to all client EGMs on a casino floor through the service gateway.

7. A system comprising:
a plurality of electronic gaming machines (EGMs) in communication with each other via a network, wherein each gaming machine includes:
a processing device; and
a memory in communication with the processing device, the memory including computer readable instructions executable by the processing device to:
receive a designation at a first electronic gaming machine (EGM) that the first EGM is a service gateway wherein receiving the designation includes downloading a control program, and in response to the downloading, switching the first EGM into a gateway mode and converting the first EGM into the service gateway;
broadcast to other EGMs of the plurality of EGMs that the first EGM is the service gateway; and
perform at least one operation of:
wherein the first EGM is a host EGM, discovering the other EGMs of the plurality of EGMs, identifying the other EGMs as client EGMs, and obtaining data from all of the client EGMs,
retrieving crash data from all of the client EGMs, and
communicating with a server to request performance of the at least one of the operations on selected ones of the plurality of EGMs.

8. The system of claim 7, wherein the receiving the designation includes providing access to a control program in response to receipt of an encryption key, switching the first EGM into a gateway mode, and in response to switching to the gateway mode, executing the control program to convert the first EGM into the service gateway.

9. The system of claim 7, wherein the broadcasting includes using a broadcast or multicast network protocol to inform the other EGMs that the first EGM is the service gateway.

10. The system of claim 7, wherein the discovering includes exchanging certificates between the service gateway and the client EGMs.

11. The system of claim 7, wherein the processing device further is validating games on all client EGMs on a casino floor through the service gateway.

12. A computer program product for managing a plurality of electronic gaming machines (EGMs) using a processing device, the computer program product comprising a non-transitory computer-readable storage medium having computer-readable program portions stored therein, the computer-readable program code portions comprising:
computer code for receiving a designation at a first electronic gaming machine (EGM) that the first EGM is a service gateway, wherein receiving the designation includes downloading a control program, and in response to the downloading, switching the first EGM into a gateway mode and converting the first EGM into the service gateway;
computer code for broadcasting to other EGMs of the plurality of EGMs that the first EGM is the service gateway; and
computer code for performing at least one operation of:
wherein the first EGM is a host EGM, discovering the other EGMs of the plurality of EGMs, identifying the other EGMs as client EGMs, and obtaining data from all of the client EGMs,
retrieving crash data from all of the client EGMs, and
communicating with a server to request performance of the at least one of the operations on selected ones of the plurality of EGMs.

13. The computer program product of claim 12, wherein the computer code for receiving the designation includes computer code for providing access to a control program in response to receipt of an encryption key, switching the first EGM into a gateway mode, and in response to switching to the gateway mode, executing the control program to convert the first EGM into the service gateway.

14. The computer program product of claim 12, wherein the computer code for broadcasting includes computer code for using a broadcast or multicast network protocol to inform the other EGMs that the first EGM is the service gateway.

15. The computer program product of claim 12, wherein the computer code for discovering includes computer code for exchanging certificates between the service gateway and the client EGMs.

16. The computer program product of claim 12, further comprising computer code for validating games on all client EGMs on a casino floor through the service gateway.

17. The computer program product of claim 12, further comprising computer code for downloading software packages onto the host EGM and distributing the downloaded software packages to all client EGMs on a casino floor through the service gateway.

* * * * *